(12) United States Patent
Narita

(10) Patent No.: US 12,493,370 B2
(45) Date of Patent: Dec. 9, 2025

(54) TOUCH PANEL APPARATUS

(71) Applicant: JVCKENWOOD Corporation, Yokohama (JP)

(72) Inventor: Yoko Narita, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 18/732,118

(22) Filed: Jun. 3, 2024

(65) Prior Publication Data

US 2024/0319807 A1   Sep. 26, 2024

Related U.S. Application Data

(63) Continuation of application No. PCT/JP2022/021732, filed on May 27, 2022.

(30) Foreign Application Priority Data

Dec. 14, 2021   (JP) ................ 2021-202491

(51) Int. Cl.
| | |
|---|---|
| G06F 3/041 | (2006.01) |
| G02F 1/1333 | (2006.01) |
| H05F 3/02 | (2006.01) |
| H05F 3/04 | (2006.01) |

(52) U.S. Cl.
CPC .......... *G06F 3/041* (2013.01); *G02F 1/13338* (2013.01); *H05F 3/02* (2013.01); *H05F 3/04* (2013.01); *G02F 2201/50* (2013.01)

(58) Field of Classification Search
CPC ........... G02F 2201/50; H05F 3/02; H05F 3/04
See application file for complete search history.

(56) References Cited

U.S. PATENT DOCUMENTS

| | | | | |
|---|---|---|---|---|
| 2014/0092519 | A1* | 4/2014 | Yang | H05K 1/0259 29/850 |
| 2015/0002980 | A1* | 1/2015 | Hsu | H05K 5/0243 361/220 |
| 2017/0135188 | A1* | 5/2017 | Heidebrecht | G02F 1/133308 |
| 2017/0332484 | A1* | 11/2017 | Shangguan | H05K 1/0259 |

(Continued)

FOREIGN PATENT DOCUMENTS

JP   2014182625 A   9/2014

OTHER PUBLICATIONS

International Search Report of PCT/JP2022/021732, dated Aug. 2, 2022, in 4 pages.

*Primary Examiner* — Ke Xiao
*Assistant Examiner* — Jennifer L Zubajlo
(74) *Attorney, Agent, or Firm* — PROCOPIO, CORY, HARGREAVES & SAVITCH LLP

(57) ABSTRACT

A touch panel apparatus according to the present disclosure includes: a touch panel; a main body portion including a support surface supporting the touch panel, and configured to hold the touch panel supported by the support surface; and a metal part provided behind the support surface, and configured to absorb static electricity infiltrating from a surface of the touch panel. The main body portion includes a through hole penetrating through the main body portion from the support surface to a region facing the metal part of a region behind the support surface, and a rib provided adjacent to the through hole and integrally with the main body portion, on the support surface.

6 Claims, 11 Drawing Sheets

(56) References Cited

U.S. PATENT DOCUMENTS

| | | | |
|---|---|---|---|
| 2021/0048923 A1* | 2/2021 | Niwa | G06F 1/1643 |
| 2021/0083038 A1* | 3/2021 | Jeon | H10K 59/131 |
| 2021/0263363 A1* | 8/2021 | Horie | H05B 33/28 |

* cited by examiner

TOUCH PANEL APPARATUS

CROSS REFERENCE TO RELATED APPLICATION

This application is based upon and claims the benefit of priority from Japanese patent application No. 2021-202491, filed on Dec. 14, 2021, the disclosure of which is incorporated herein in its entirety by reference.

BACKGROUND

The present disclosure relates to a touch panel apparatus, and to a touch panel apparatus suitable for effectively removing static electricity while suppressing increase in cost.

Japanese Unexamined Patent Application Publication No. 2014-182625 discloses an operation panel unit including a lightning rod as a countermeasure against static electricity.

SUMMARY

However, in the structure disclosed in Japanese Unexamined Patent Application Publication No. 2014-182625, the lightning rod is configured by a part different from a part configuring an insulation case and the like. Therefore, there has been the problem that the number of parts is increased, and a cost is accordingly increased.

A touch panel apparatus according to the present disclosure includes: a touch panel; a main body portion including a support surface supporting the touch panel, and configured to hold the touch panel supported by the support surface; and a metal part provided behind the support surface, and configured to absorb static electricity infiltrating from a surface of the touch panel. The main body portion includes a through hole penetrating through the main body portion from the support surface to a region facing the metal part of a region behind the support surface, and a rib provided adjacent to the through hole and integrally with the main body portion, on the support surface.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
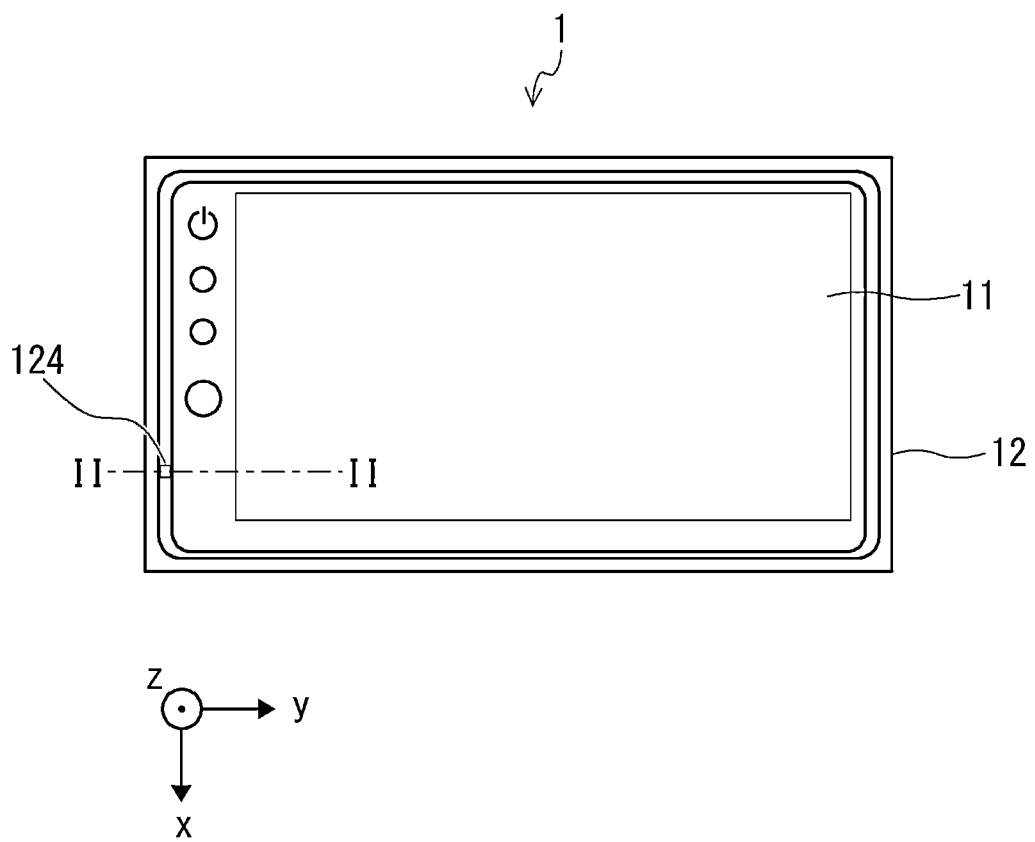
FIG. 1 is a schematic front view of a touch panel apparatus according to a first embodiment.

In the following, a specific embodiment to which the present invention is applied is described in detail with reference to drawings. In the drawings, the same elements are denoted by the same reference numerals, and repetitive description is omitted as necessary for clarification of description.

First Embodiment

Figure 2:
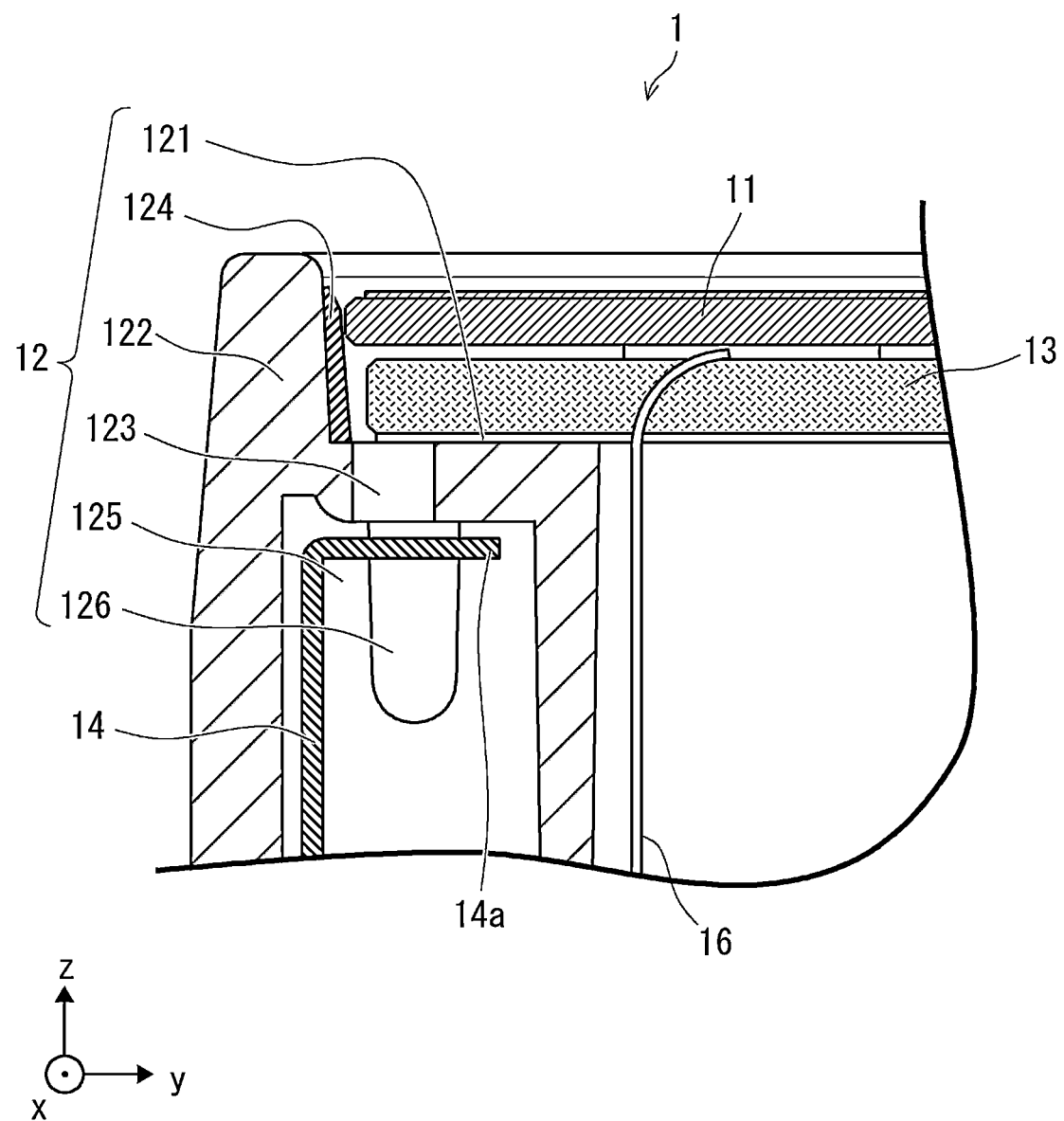
FIG. 2 is a schematic cross-sectional view of the touch panel apparatus according to the first embodiment.
Figure 3:
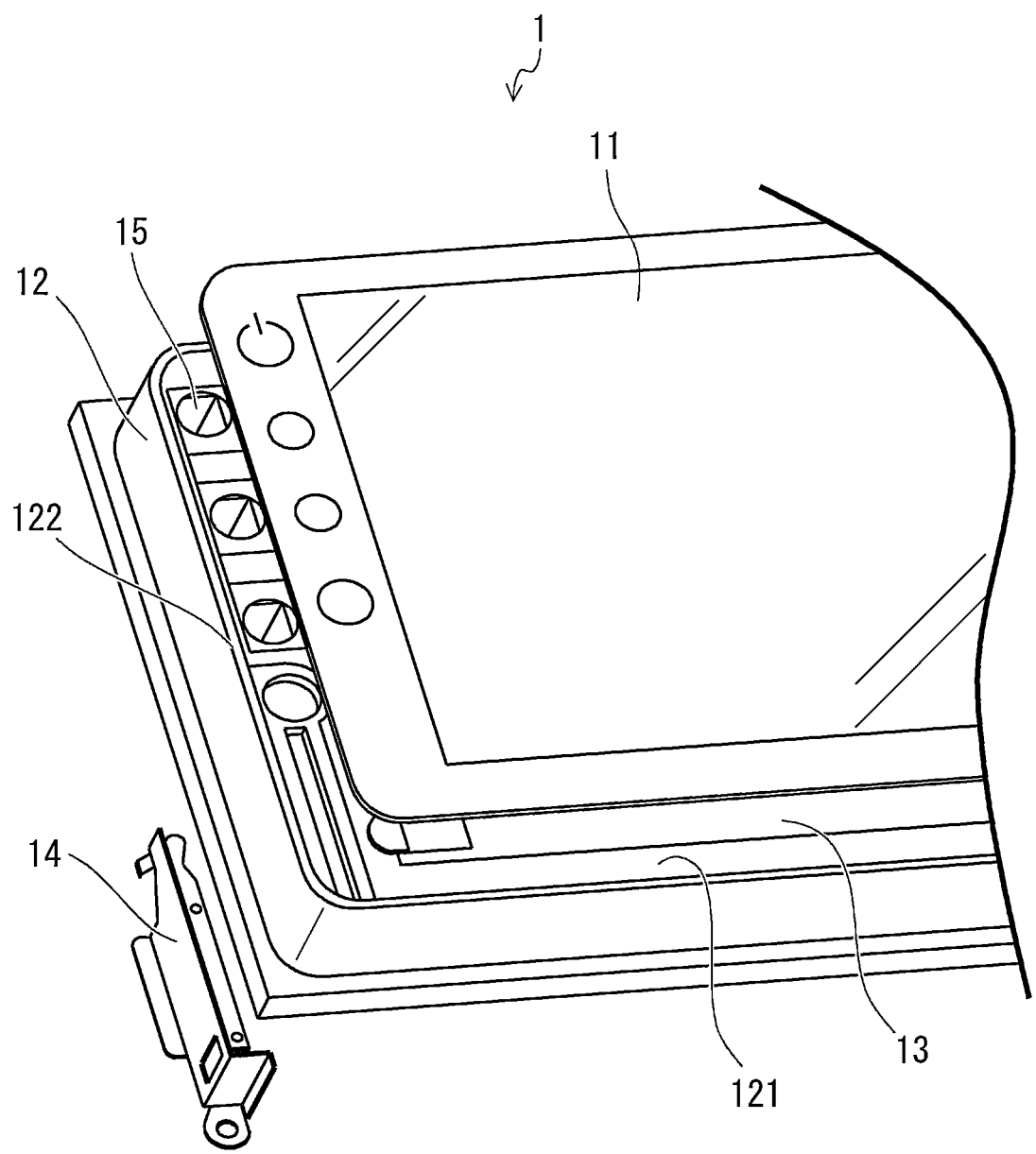
FIG. 3 is a schematic perspective view of the touch panel apparatus according to the first embodiment.
Figure 4:
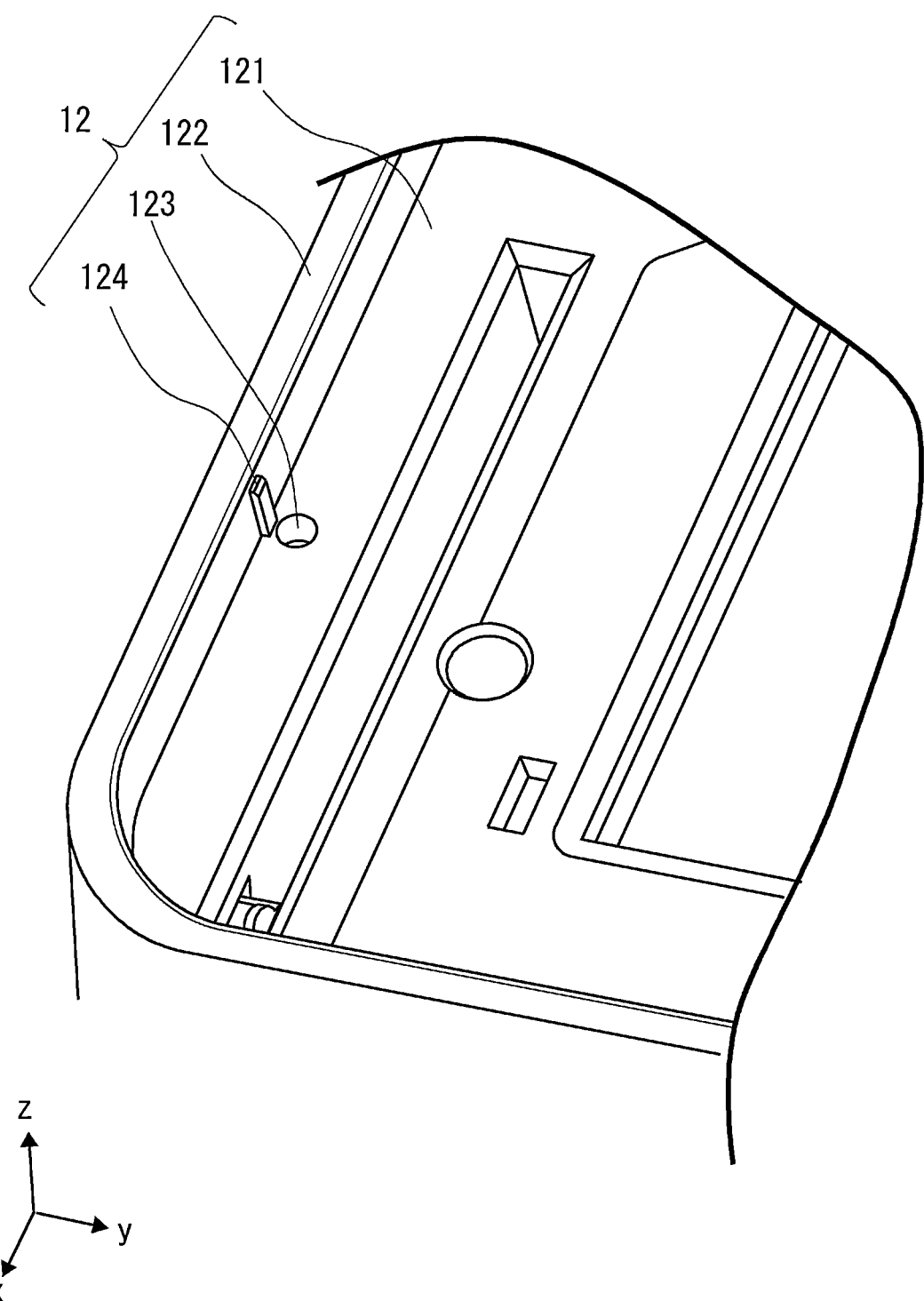
FIG. 4 is a schematic perspective view illustrating a part of the touch panel apparatus illustrated in FIG. 3, in an enlarged manner.

FIG. 1 is a schematic front view of a touch panel apparatus 1 according to a first embodiment. FIG. 2 is a schematic cross-sectional view of the touch panel apparatus 1 according to the first embodiment. FIG. 2 illustrates a cross-section of a portion taken along line II-II in FIG. 1. FIG. 3 is a schematic perspective view of the touch panel apparatus 1 according to the first embodiment. FIG. 4 is a schematic perspective view illustrating a part of the touch panel apparatus 1 illustrated in FIG. 3, in an enlarged manner.

The touch panel apparatus 1 according to the present embodiment is, for example, a car navigation, a smart phone, or a tablet terminal, and is a display apparatus including a touch panel receiving data input by touch operation (input operation) using a finger, a touch pen, or the like by a user. The touch panel apparatus 1 includes a rib and a through hole on a support surface of a main body portion supporting the touch panel, thereby causing static electricity infiltrating from a surface of the touch panel to be attracted to the rib, and causing the static electricity to be effectively absorbed by a sheet metal part corresponding to a ground (GND) through the rib and the through hole. Further, in the touch panel apparatus 1, the rib is provided integrally with the main body portion. Therefore, the number of parts is reduced, and increase in cost is accordingly suppressed. In other words, the touch panel apparatus 1 can effectively remove static electricity while suppressing increase in cost. A specific description is given below.

As illustrated in FIG. 1 to FIG. 4, the touch panel apparatus 1 at least includes a touch panel 11, a main body portion 12, an LCD 13, and a sheet metal part 14. LCD is an abbreviation for Liquid Crystal Display.

The main body portion 12 is made of a synthetic resin or the like, and at least includes a support surface 121 and a panel frame 122. The support surface 121 supports the LCD 13 and the touch panel 11. The panel frame 122 is provided so as to surround outer peripheral sides of the LCD 13 and the touch panel 11. The LCD 13 and the touch panel 11 are held to the main body portion 12 by the support surface 121 and the panel frame 122.

The user performs pressing operation on an image displayed on the LCD 13 by using a finger, a touch pen, or the like through the touch panel 11. The touch panel 11 receives data input by the pressing operation using the finger, the touch pen, or the like by the user. The data received by the touch panel 11 and an operation button 15 is input to an internal circuit (not illustrated) provided inside the main body portion 12 through a signal line 16. The internal circuit performs predetermined processing based on the input data, communicates with an external apparatus (not illustrated), and controls the image displayed on the LCD 13.

The sheet metal part 14 is a metal part made of a metal such as copper and aluminum, and corresponds to the ground absorbing static electricity. The sheet metal part 14 is provided inside the main body portion 12. More specifically, the sheet metal part 14 is provided behind (on rear side of) the support surface 121 of the main body portion 12, inside the main body portion 12. In this example, a front end 14a of the plate metal part 14 is disposed so as to enter a concave portion 125 provided behind the support surface 121 of the main body portion 12. The front end 14a of the sheet metal part 14 is fixed by a stopper 126 provided in the concave portion 125. The sheet metal part 14 is provided inside the main body portion 12, which maintains aesthetic appearance of the touch panel apparatus 1.

The main body portion 12 includes a through hole 123 that penetrates through the main body portion 12 from the support surface 121 to a region facing the sheet metal part 14 (in this example, region facing front end 14a of sheet metal part 14 fixed to concave portion 125) of a region behind the support surface 121. More specifically, the through hole 123 is provided from a region adjacent to a rib 124 provided integrally with the panel frame 122 of the support surface 121 (namely, region adjacent to gap provided between panel frame 122 and touch panel 11) to the region facing the front end 14a of the sheet metal part 14 fixed to the concave portion 125 of the region behind the support surface 121.

Further, the main body portion 12 includes, on the support surface 121, the rib 124 that is provided adjacent to the through hole 123 and integrally with the main body portion 12. More specifically, the rib 124 is provided integrally with the panel frame 122 of the main body portion 12 so as to extend from the support surface 121 toward a surface of the touch panel 11 along a side surface of the panel frame 122. In other words, the rib 124 is provided integrally with the panel frame 122 of the main body portion 12 so as to extend from the support surface 121 toward the surface of the touch panel 11 along the gap provided between the panel frame 122 and the touch panel 11. The rib 124 is made of the synthetic resin or the like same as the panel frame 122.

The static electricity is generally easily attracted to an object that is close to the static electricity and has a sharp shape. Therefore, the static electricity infiltering from the surface of the touch panel 11 is easily attracted to the rod-shaped rib 124 extending from the support surface 121 toward the surface of the touch panel 11. In other words, the rib 124 functions as a lightning rod for the static electricity infiltrating from the surface of the touch panel 11.

Figure 5:
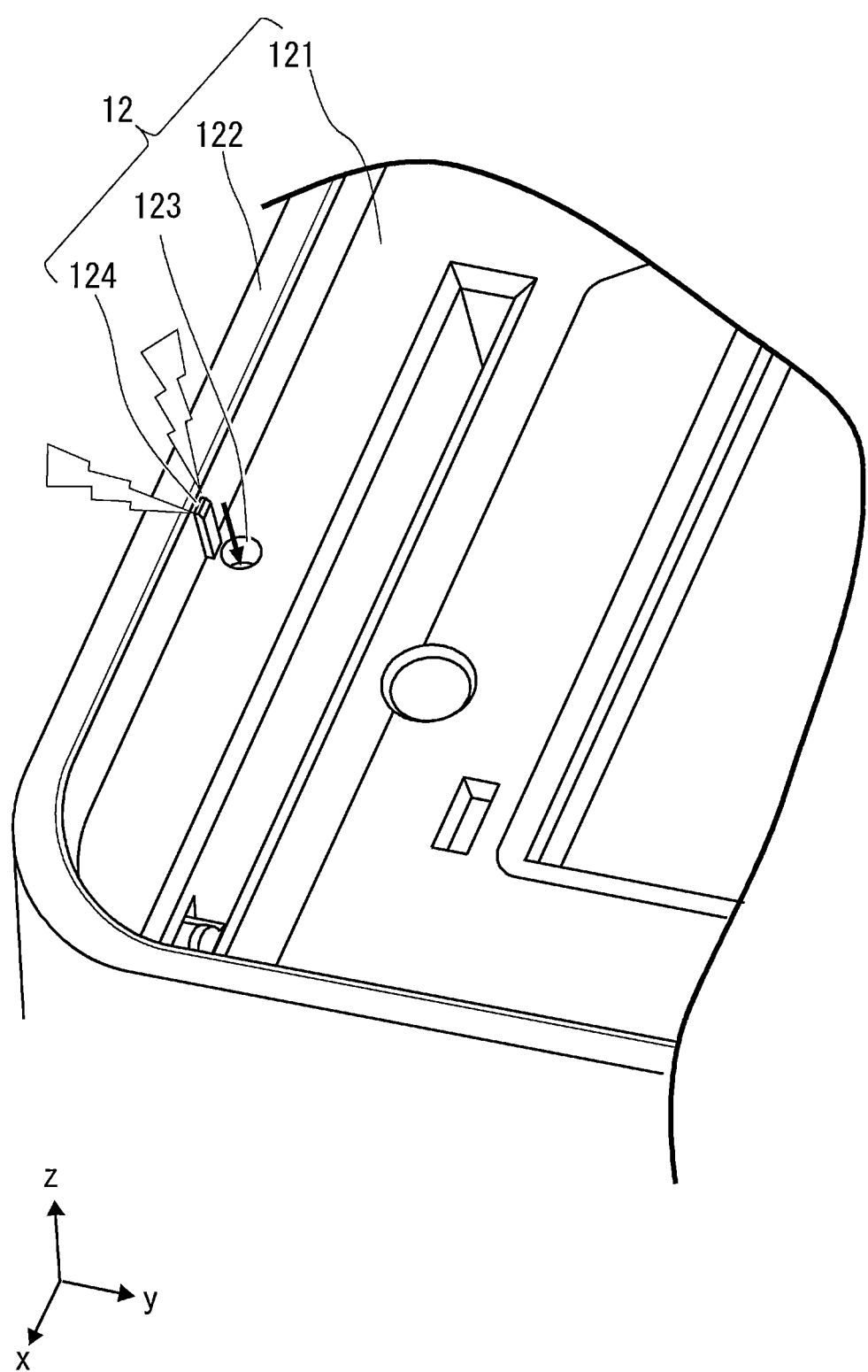
FIG. 5 is a diagram to explain effects of countermeasures against static electricity in the touch panel apparatus according to the first embodiment.

More specifically, the static electricity infiltrating from the surface of the touch panel 11 is attracted to the rib 124, and is absorbed by the sheet metal part 14 corresponding to the ground through the rib 124 and the through hole 123 (see FIG. 5). At this time, it is sufficient that one through hole 123 adjacent to the rib 124 is provided within a range of a creepage distance from the rib 124 as a base point, and a plurality of through holes 123 do not need to be formed. 20

A front end (end on side close to touch panel 11) 124a of the rib 124 is preferably provided at an acute angle. In addition, the front end 124a of the rib 124 is preferably provided at a position above the surface of the touch panel 11 (on plus side in z-axis direction). Further, conductive paint such as copper may be applied to a surface of the rib 124. As a result, the static electricity infiltrating from the surface of the touch panel 11 is further easily attracted to the rib 124.

Figure 6:
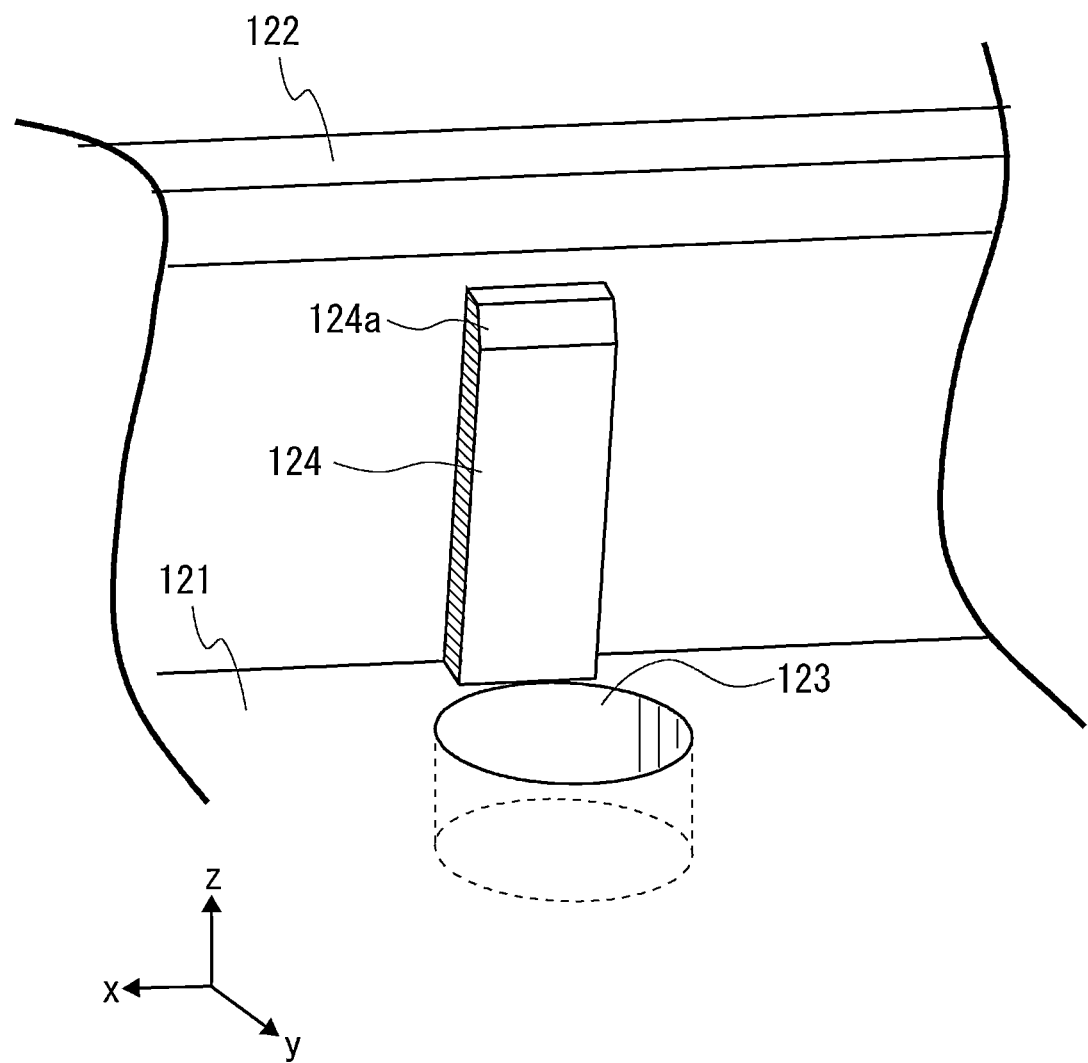
FIG. 6 is a diagram illustrating a specific shape of a rib provided in the touch panel apparatus according to the first embodiment.

FIG. 6 is a diagram illustrating a specific shape of the rib 124. In an example of FIG. 6, the rib 124 is formed in a plate shape, and is processed so as to taper at the front end 124a. The rib 124 illustrated in FIG. 6 can function as a lightning rod for the static electricity infiltrating from the surface of the touch panel 11.

If no rib 124 is provided, the static electricity infiltrating from the surface of the touch panel 11 does not always fall to a vicinity of the through hole 123. Therefore, the static electricity is not effectively absorbed by the sheet metal part 14. Therefore, in a case where no rib 124 is provided, for example, it is necessary, as a countermeasure, to form a number of through holes 123 within the range of the required creepage distance such that, even when the static electricity falls to somewhere on the main body portion 12, the static electricity is absorbed by the sheet metal part 14 through any of the through holes 123 near a falling point. However, the structure of the touch panel apparatus including a number of through holes 123 is inefficient as the countermeasure against static electricity in the first place, and causes dust, moisture, and the like to easily enter the inside of the main body portion 12.

As described above, the touch panel apparatus 1 according to the present embodiment includes the through hole 123 and the rib 124 on the support surface 121 of the main body portion 12 supporting the touch panel 11, thereby causing the static electricity infiltrating from the surface of the touch panel 11 to be attracted to the rib 124, and allowing the static electricity to be effectively absorbed by the sheet metal part 14 corresponding to the ground through the rib 124 and the through hole 123. Further, in the touch panel apparatus 1, since the rib 124 is provided integrally with the main body portion 12, the number of parts is reduced. As a result, increase in cost is suppressed. In other words, the touch panel apparatus 1 according to the present embodiment can effectively remove the static electricity while suppressing increase in cost. Note that, in the structure disclosed in Japanese Unexamined Patent Application Publication No. 2014-182625, a metal frame used as the lightning rod is disposed at a portion touched by the user. Therefore, safety countermeasures are necessary. In contrast, in the touch panel apparatus 1 according to the present embodiment, not the metal frame but the rib 124 provided integrally with the panel frame 122 made of a synthetic resin or the like is used as the lightning rod. Therefore, safety countermeasures are unnecessary.

In the present embodiment, a case where the through hole 123 has a circular shape in a top view is described as an example; however, the shape of the through hole 123 is not limited thereto, and the through hole 123 may have a rectangular shape or other shapes.

The shape of the rib 124 is not limited to the shape illustrated in FIG. 6. The other shapes of the rib 124 are described with reference to FIG. 7 to FIG. 11.

Figure 7:
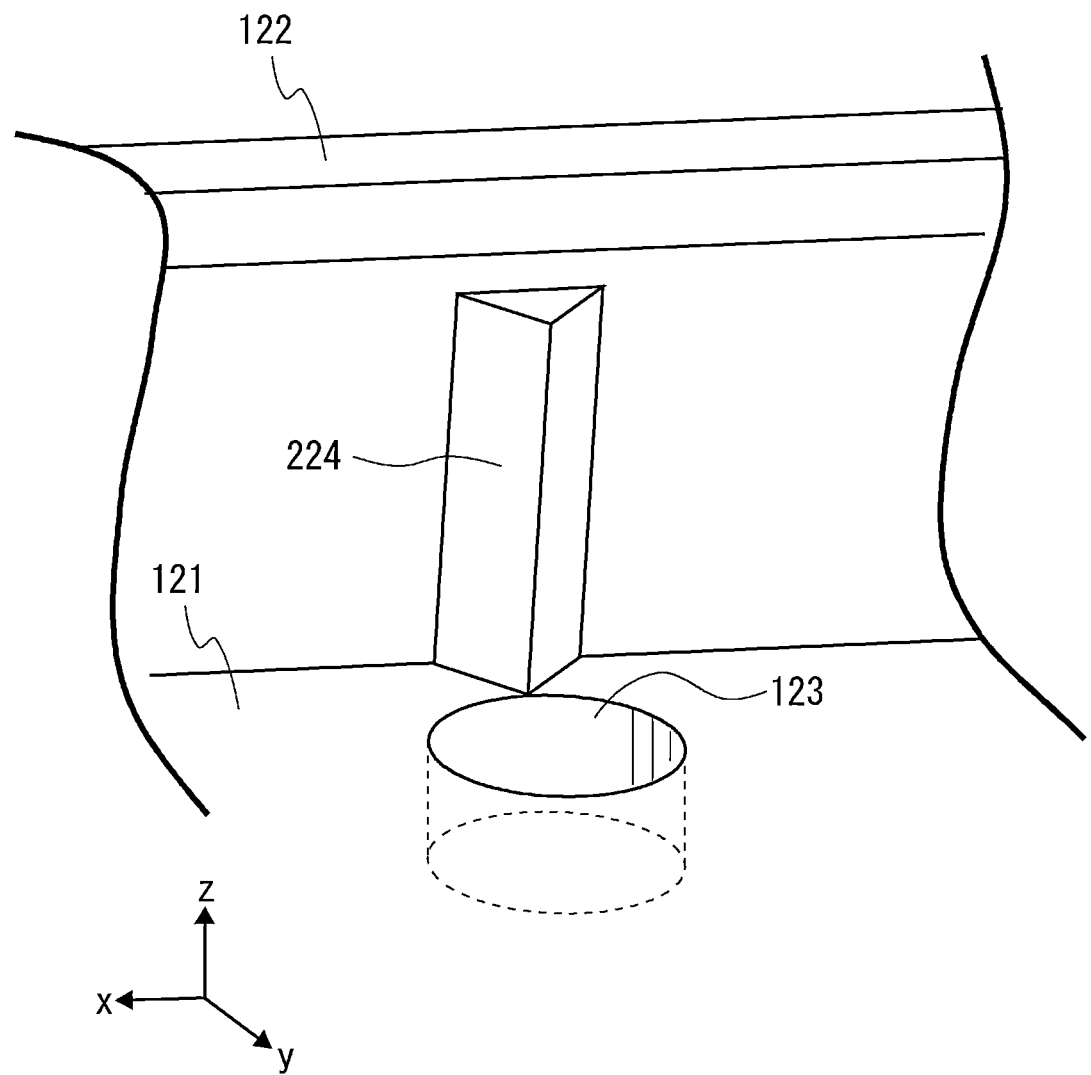
FIG. 7 is a diagram illustrating a first modified example of the rib.

FIG. 7 is a diagram illustrating a rib 224 that is a first modified example of the rib 124. In the example of FIG. 7, the rib 224 is provided in a triangular prism shape in a state where a bottom surface is disposed on the support surface 121. Even in a case of using the rib 224 in place of the rib 124, the touch panel apparatus 1 can achieve effects equivalent to the effects in the case of using the rib 124.

Figure 8:
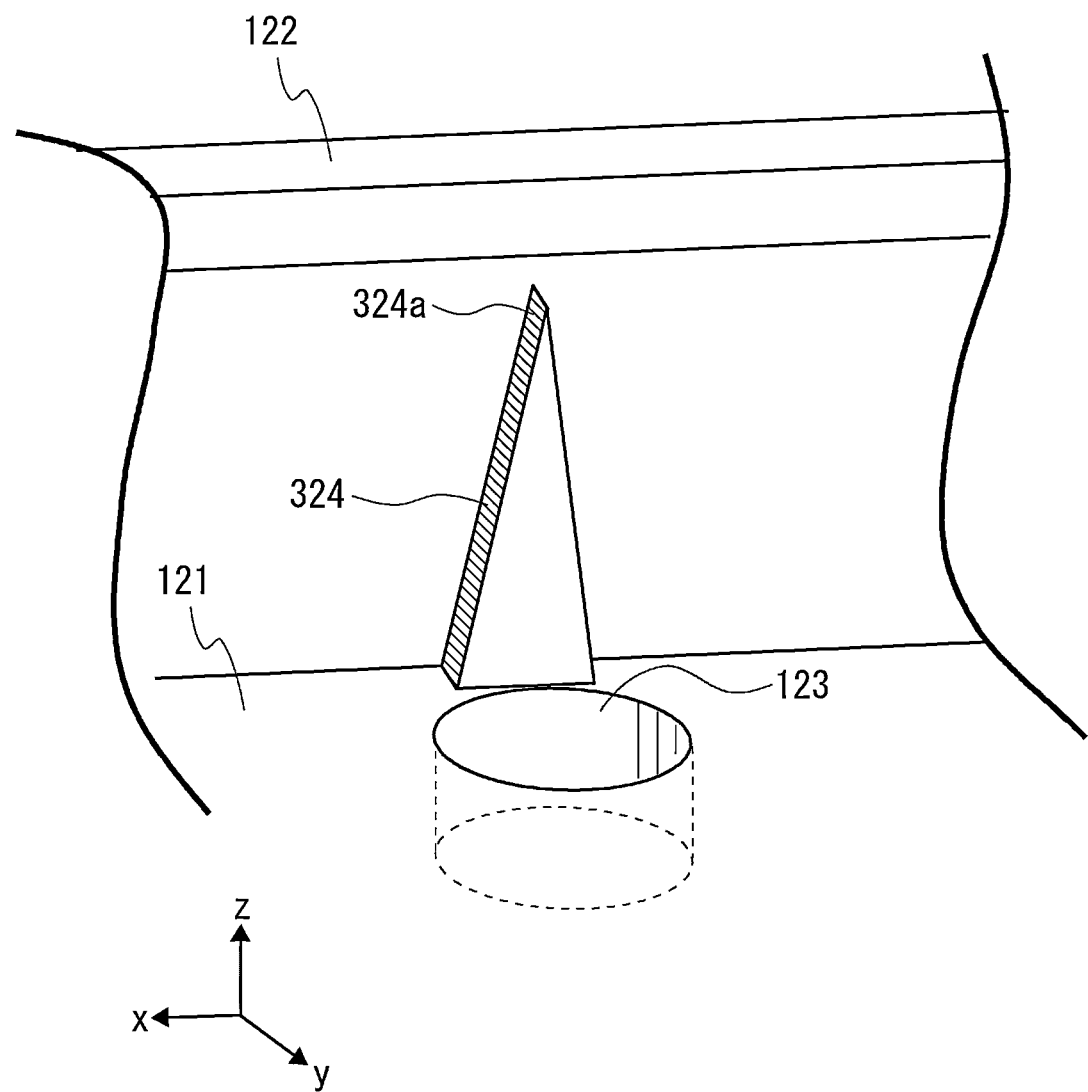
FIG. 8 is a diagram illustrating a second modified example of the rib.

FIG. 8 is a diagram illustrating a rib 324 that is a second modified example of the rib 124. In the example of FIG. 8, the rib 324 is provided in a triangular prism shape in a state where a side surface is disposed on the support surface 121. In a view of a y-axis direction, one corner 324a of a triangle extends vertically upward (to plus side in z-axis direction).

Even in a case of using the rib 324 in place of the rib 124, the touch panel apparatus 1 can achieve effects equivalent to the effects in the case of using the rib 124.

Figure 9:
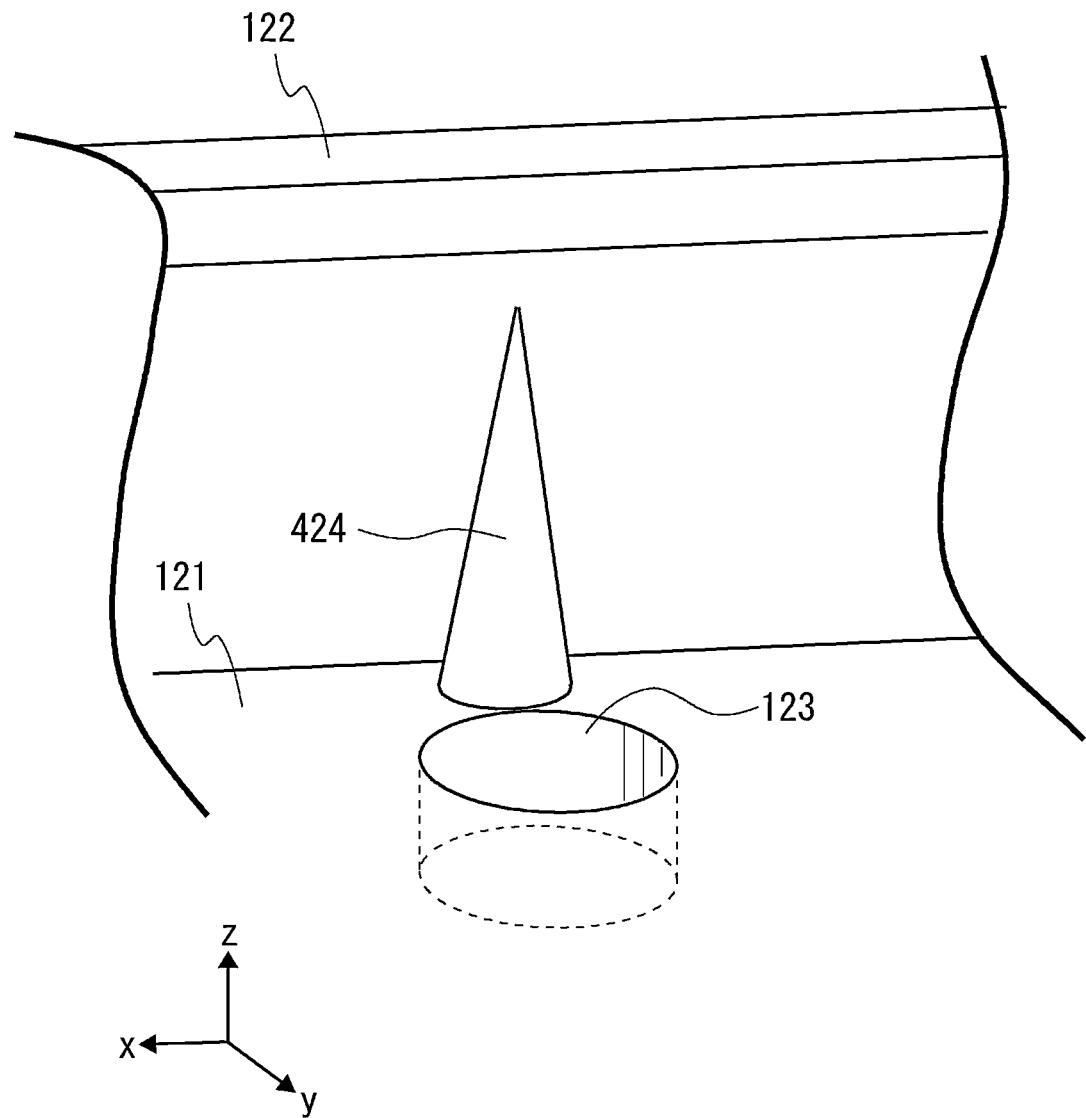
FIG. 9 is a diagram illustrating a third modified example of the rib.

FIG. 9 is a diagram illustrating a rib 424 that is a third modified example of the rib 124. In the example of FIG. 9, the rib 424 is provided in a conical shape in a state where a bottom surface is disposed on the support surface 121. Even in a case of using the rib 424 in place of the rib 124, the touch panel apparatus 1 can achieve effects equivalent to the effects in the case of using the rib 124.

Figure 10:
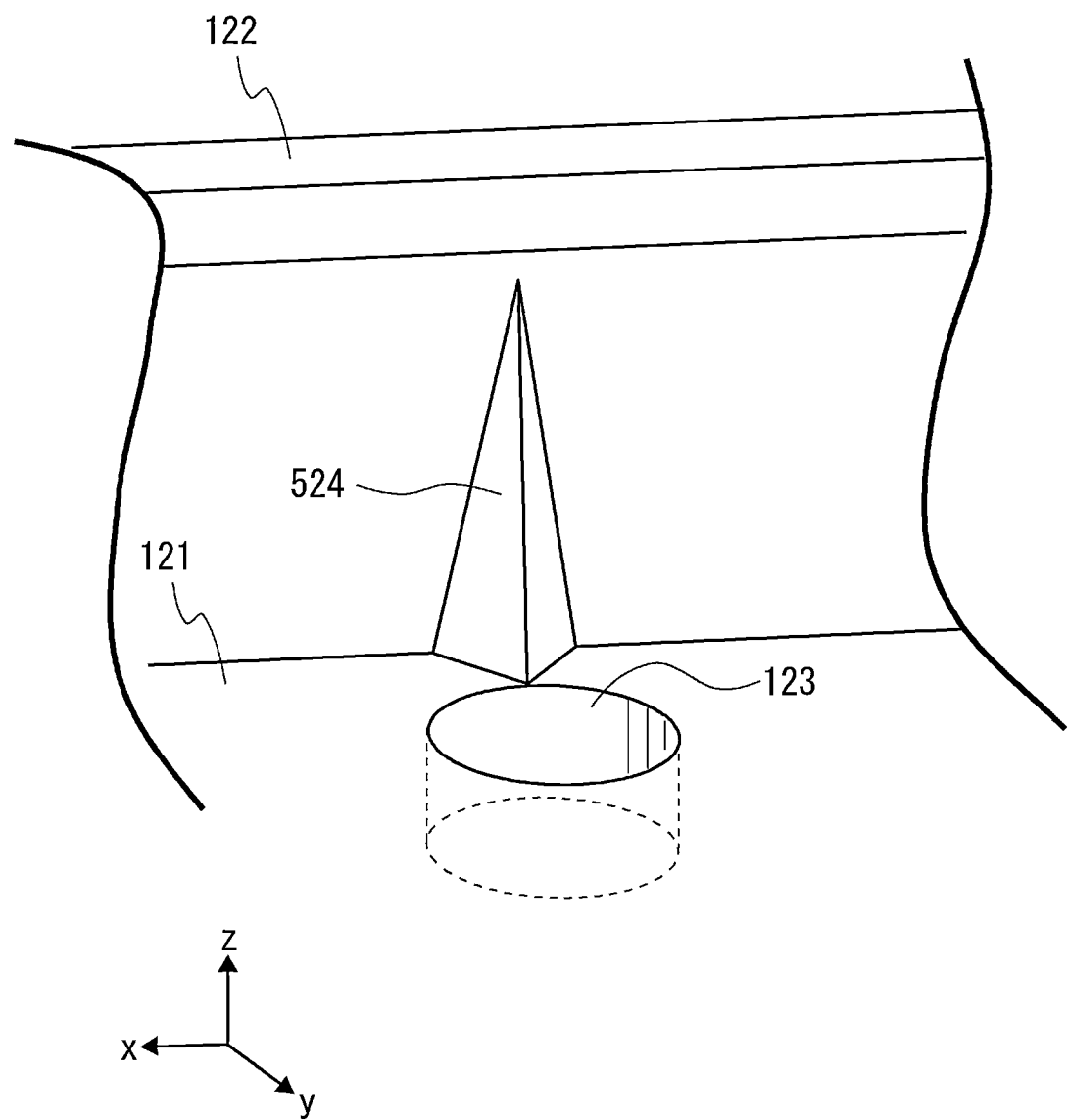
FIG. 10 is a diagram illustrating a fourth modified example of the rib.

FIG. 10 is a diagram illustrating a rib 524 that is a fourth modified example of the rib 124. In the example of FIG. 10, the rib 524 is provided in a triangular pyramid shape in a state where a bottom surface is disposed on the support surface 121. Even in a case of using the rib 524 in place of the rib 124, the touch panel apparatus 1 can achieve effects equivalent to the effects in the case of using the rib 124.

Figure 11:
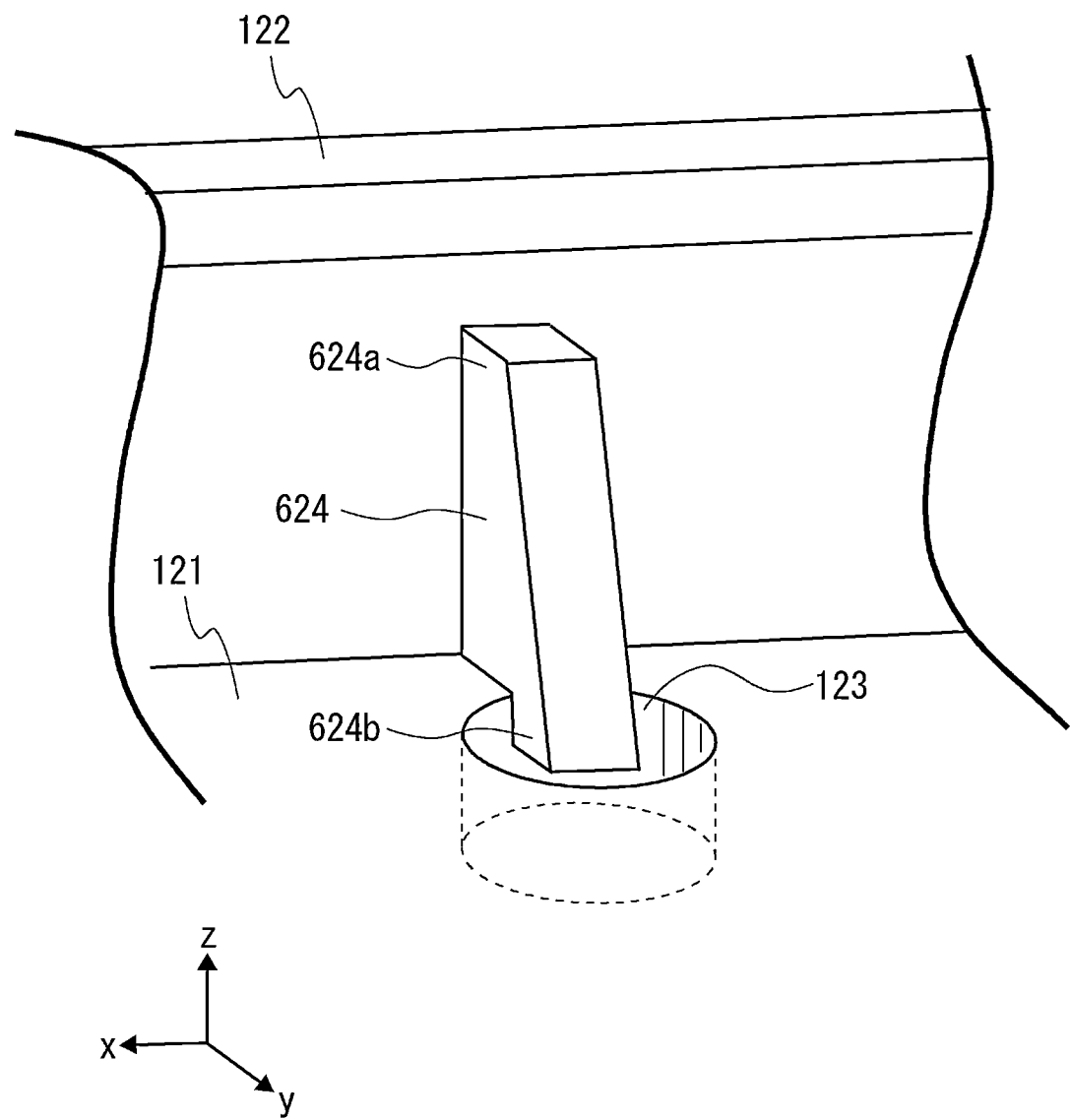
FIG. 11 is a diagram illustrating a fifth modified example of the rib.

FIG. 11 is a diagram illustrating a rib 624 that is a fifth modified example of the rib 124. In the rib 624 illustrated in FIG. 11, an end 624*b* is provided so as to be positioned inside the through hole 123, separately from a front end 624*a* extending toward the surface of the touch panel 11. The rib 624 can attract the static electricity infiltrating from the surface of the touch panel 11, and can more accurately deliver the static electricity to the through hole 123.

Although the invention made by the present inventor is specifically described above based on the embodiment, it is needless to say that the present invention is not limited to the above-descried embodiment, and can be variously modified without departing from the gist of the present invention.

According to the present embodiment, it is possible to provide the touch panel apparatus suitable for effectively removing static electricity while suppressing increase in cost.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A touch panel apparatus comprising:
   a touch panel;
   a main body portion including a support surface supporting the touch panel, and configured to hold the touch panel supported by the support surface; and
   a metal part provided behind the support surface, and configured to absorb static electricity infiltrating from a surface of the touch panel,
   wherein the main body portion includes a through hole penetrating through the main body portion from the support surface to a region facing the metal part of a region behind the support surface, and a rib provided adjacent to the through hole and integrally with the main body portion, on the support surface.

2. The touch panel apparatus according to claim 1, wherein the rib includes, on a side close to the touch panel, an end formed at an acute angle.

3. The touch panel apparatus according to claim 1, wherein the rib is formed such that an end on a side close to the touch panel is positioned above the surface of the touch panel.

4. The touch panel apparatus according to claim 1, wherein the rib is formed such that an end on a side close to the through hole is positioned inside the through hole.

5. The touch panel apparatus according to claim 1, wherein a surface of the rib is coated with conductive paint.

6. The touch panel apparatus according to claim 1, wherein the through hole is provided from a region adjacent to the rib of the support surface to a region facing a front end of the metal part of a region behind the support surface.

* * * * *